(12) United States Patent
Cedervall et al.

(10) Patent No.: US 8,548,498 B2
(45) Date of Patent: *Oct. 1, 2013

(54) ANONYMOUS POSITIONING OF A WIRELESS UNIT FOR DATA NETWORK LOCATION-BASED SERVICES

(75) Inventors: Mats Cedervall, Taby (SE); Thomas Ekerborn, Upplands Vasby (SE)

(73) Assignee: Unwired Planet, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/339,295

(22) Filed: Dec. 28, 2011

(65) Prior Publication Data

US 2012/0165044 A1    Jun. 28, 2012

Related U.S. Application Data

(60) Continuation of application No. 11/410,589, filed on Apr. 24, 2006, now Pat. No. 8,112,099, which is a division of application No. 10/323,579, filed on Dec. 18, 2002, now Pat. No. 7,062,279, and a continuation-in-part of application No. PCT/US01/48518, filed on Dec. 14, 2001, and a continuation-in-part of application No. PCT/US01/49812, filed on Oct. 22, 2001, and a continuation-in-part of application No. PCT/IB01/02867, filed on Oct. 19, 2001, and a continuation-in-part of application No. PCT/US01/27286, filed on Aug. 30, 2001, which is a continuation-in-part of application No. PCT/SE01/01412, filed on Jun. 20, 2001.

(30) Foreign Application Priority Data

| Jun. 22, 2000 | (SE) | 0002390 |
| Oct. 23, 2000 | (SE) | 0003911 |
| Dec. 14, 2000 | (SE) | 0004673 |
| Jan. 17, 2001 | (SE) | 0100147 |

(51) Int. Cl.
H04W 24/00 (2009.01)

(52) U.S. Cl.
USPC .................... 455/456.1; 455/456.3

(58) Field of Classification Search
USPC ............... 455/456.1, 456.3, 456.5, 410, 411, 455/414.2, 414.3, 456.6
See application file for complete search history.

(56) References Cited

U.S. PATENT DOCUMENTS

| 5,208,756 A | 5/1993 | Song |
| 5,218,367 A | 6/1993 | Sheffer et al. |

(Continued)

FOREIGN PATENT DOCUMENTS

| DE | 3827352 A1 | 2/1990 |
| EP | 0647076 | 4/1995 |

(Continued)

OTHER PUBLICATIONS

Asthana, Abhaya et al, "An Indoor Wireless System for Personalized Shopping Assistance," IEEE Computer Society Press, Workshop on Mobile Computing Systems and Applications, pp. 69-74, Dec. 8-9, 1994.

*Primary Examiner* — Sonny Trinh
(74) *Attorney, Agent, or Firm* — Sheppard, Mullin, Richter & Hampton LLP

(57) ABSTRACT

This invention concerns a process and a system for providing location information for a wireless unit in a wireless network to a location-based service provider, using a data network. In particular, the location information is provided to the location-based service provider without necessarily providing the identity of wireless unit, e.g., a subscriber's wireless identification number, to the service provider. In this regard, a subscriber's identification number may be hidden from the positioning service provider via a process in which an alias is used instead of the subscriber's normal identity. The subscriber's number may further be concealed from the service provider via a process wherein encrypted information is used instead of the subscriber's normal identity.

6 Claims, 5 Drawing Sheets

(56) References Cited

U.S. PATENT DOCUMENTS

| | | | |
|---|---|---|---|
| 5,235,633 A * | 8/1993 | Dennison et al. | 455/456.3 |
| 5,568,153 A | 10/1996 | Beliveau | |
| 5,577,100 A | 11/1996 | McGregor et al. | |
| 5,675,628 A | 10/1997 | Hokkanen | |
| 5,721,678 A | 2/1998 | Widl | |
| 5,767,788 A | 6/1998 | Ness | |
| 5,774,802 A | 6/1998 | Tell et al. | |
| 5,787,354 A | 7/1998 | Gray et al. | |
| 5,835,061 A | 11/1998 | Stewart | |
| 5,850,433 A | 12/1998 | Rondeau | |
| 5,884,221 A | 3/1999 | Wortham | |
| 5,930,474 A | 7/1999 | Dunworth et al. | |
| 5,930,699 A | 7/1999 | Bhatia | |
| 5,948,041 A | 9/1999 | Abo et al. | |
| 6,038,442 A | 3/2000 | Ueda et al. | |
| 6,070,083 A | 5/2000 | Watters et al. | |
| 6,091,956 A | 7/2000 | Hollenburg | |
| 6,097,938 A | 8/2000 | Paxson | |
| 6,108,533 A | 8/2000 | Brohoff | |
| 6,131,067 A | 10/2000 | Girerd et al. | |
| 6,138,003 A | 10/2000 | Kingdon et al. | |
| 6,157,841 A | 12/2000 | Bolduc et al. | |
| 6,212,392 B1 | 4/2001 | Fitch et al. | |
| 6,223,049 B1 | 4/2001 | Aakula et al. | |
| 6,256,504 B1 | 7/2001 | Tell et al. | |
| 6,263,280 B1 | 7/2001 | Stingone, Jr. | |
| 6,308,273 B1 | 10/2001 | Goertzel et al. | |
| 6,321,257 B1 | 11/2001 | Kotola et al. | |
| 6,377,810 B1 * | 4/2002 | Geiger et al. | 455/456.2 |
| 6,397,040 B1 | 5/2002 | Titmuss et al. | |
| 6,415,281 B1 | 7/2002 | Anderson | |
| 6,434,381 B1 * | 8/2002 | Moore et al. | 455/414.3 |
| 6,466,796 B1 | 10/2002 | Jacobson et al. | |
| 6,505,046 B1 | 1/2003 | Baker | |
| 6,516,197 B2 | 2/2003 | Havinis et al. | |
| 6,549,625 B1 | 4/2003 | Rautila et al. | |
| 6,647,257 B2 | 11/2003 | Owensby | |
| 6,662,006 B2 | 12/2003 | Glass | |
| 6,810,261 B1 | 10/2004 | Rollender | |
| 6,847,822 B1 * | 1/2005 | Dennison et al. | 455/456.1 |
| 6,873,846 B1 | 3/2005 | Gerber et al. | |
| 6,879,838 B2 * | 4/2005 | Rankin et al. | 455/456.6 |
| 6,985,742 B1 | 1/2006 | Giniger | |
| 7,024,205 B1 | 4/2006 | Hose | |
| 7,467,395 B2 | 12/2008 | Omori et al. | |
| 8,112,099 B2 * | 2/2012 | Cedervall et al. | 455/456.3 |
| 2001/0044309 A1 | 11/2001 | Bar et al. | |
| 2002/0042277 A1 | 4/2002 | Smith | |
| 2002/0068549 A1 | 6/2002 | Tendler | |
| 2004/0203902 A1 | 10/2004 | Wilson et al. | |
| 2004/0235493 A1 | 11/2004 | Ekerborn | |
| 2004/0266453 A1 | 12/2004 | Maanoja et al. | |

FOREIGN PATENT DOCUMENTS

| | | |
|---|---|---|
| WO | WO 98/52379 A1 | 11/1998 |
| WO | WO 00/04730 A1 | 1/2000 |
| WO | WO 00/27143 A1 | 5/2000 |
| WO | WO 01/26393 A1 | 4/2001 |
| WO | WO 01/33825 A1 | 5/2001 |
| WO | WO 01/35683 A1 | 5/2001 |

* cited by examiner

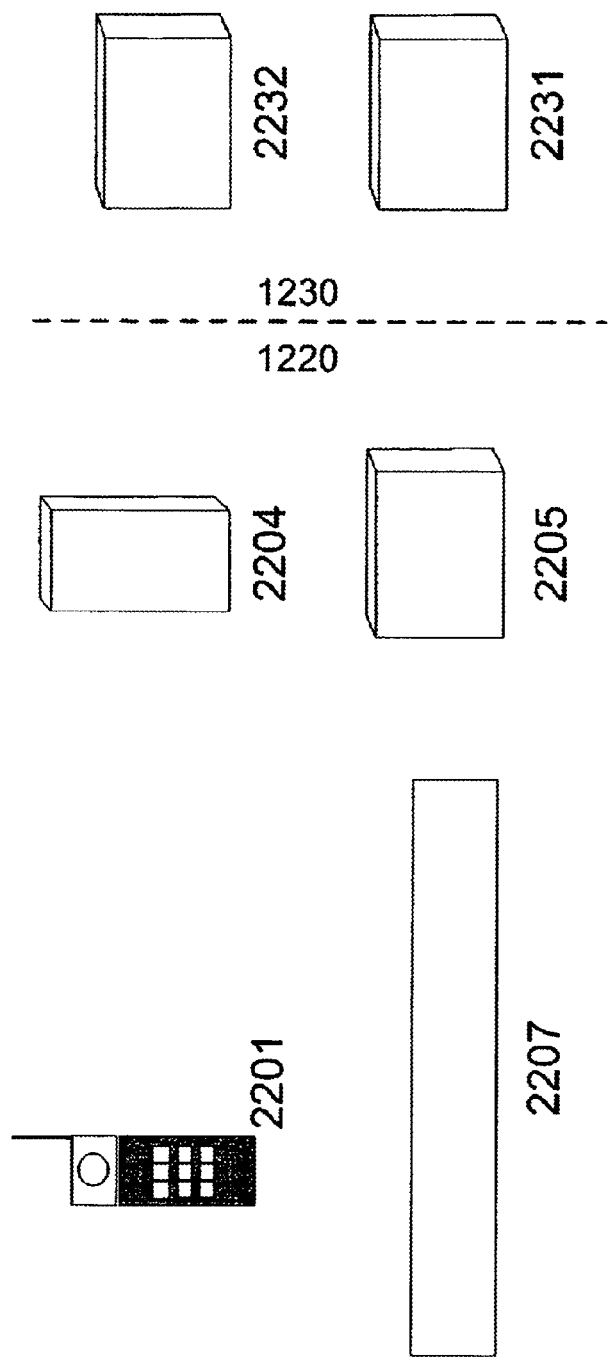

ANONYMOUS POSITIONING OF A WIRELESS UNIT FOR DATA NETWORK LOCATION-BASED SERVICES

CROSS-REFERENCES TO RELATED APPLICATIONS

This application is a continuation of U.S. application Ser. No. 11/410,589, filed Apr. 24, 2006, now U.S. Pat. No. 8,112,099, which is a divisional of U.S. application Ser. No. 10/323,579, filed Dec. 18, 2002, now U.S. Pat. No. 7,062,279;
which is a continuation-in-part of PCT/SE01/01412, filed Jun. 20, 2001, and claims priority from Swedish Patent Application 0002390-3, filed on Jun. 22, 2000;
and which is a continuation-in-part of PCT/IB01/02867, filed Oct. 19, 2001, and claims priority to Swedish Patent Application 0003792-9, filed on Oct. 19, 2000;
and which is a continuation-in-part of PCT/US01/27286, filed Aug. 30, 2001, and claims priority to Swedish Patent Application 0003070-0, filed on Aug. 30, 2000;
and which is a continuation-in-part of PCT/US01/49812, filed Oct. 22, 2001, and claims priority to Swedish Patent Application 0003911-5, filed on Oct. 23, 2000;
and which is a continuation-in-part of PCT/US01/48518, filed Dec. 14, 2001, and claims priority to Swedish Patent Application 0004673-0, filed Dec. 14, 2000, and Swedish Patent Application 0100147-8, filed Jan. 17, 2001,
all of which are hereby incorporated by reference in their entireties.

BACKGROUND OF THE INVENTION

The present invention relates to the provision of location-based services regarding wireless communications units from a service provider, via a data enabled network, to system users. The invention addresses issues relating to privacy, authentication and security (collectively "privacy") in connection with providing, to a service provider or the like, access to location information regarding a wireless unit.

Wireless communications networks generally allow for voice and/or wireless data communications between wireless units, e.g., wireless telephones (analog, digital cellular and PCS), pagers or data terminals that communicate using RF signals. In recent years, a number of location-based service systems have been implemented or proposed for wireless networks. Such systems generally involve determining location information for wireless units and processing the location information to provide an output desired for a particular application. Furthermore, recent advances in wireless data communications have made possible the utilization of wireless units to access information and/or services available on data networks, such as the Internet and the associated World Wide Web. Accordingly, a number of data network location-based services, which utilize the position of a wireless unit, have been proposed to provide localized information for a requesting wireless unit.

A number of systems for providing position information regarding the position of a wireless communications unit are currently in operation. Some of these systems are managed by wireless providers to offer location-based services to their customers. In such systems, a wireless provider's customer requests a location-based service and the location of the customer's wireless unit is determined in the wireless network. The wireless provider may utilize this location information to provide location specific information to the customer or other destination, or the location information may be provided to an external location-based service provider who provides location specific information, which is forwarded to the customer or other destination.

As will be appreciated, the identity of a wireless unit, such as a telephone, is generally associated with a customer. That is, determining the position of an identified wireless unit effectively determines the identity and position of a customer. The right to access this identity and position information is critical, as it implicates important privacy issues. Moreover, the customer's ability to control unsolicited contacts or take advantage of available service opportunities may be directly related to controlling who can access his position. Accordingly, when position information for an identified wireless unit is transferred in a data network, such as the Internet, it would be desirable to protect against unauthorized dissemination of personal customer information (e.g., user identity as well as their position).

Today, wireless providers generally cannot provide position information to an external location-based service provider while fully protecting the privacy of the customer. Additionally, users of wireless communications units generally cannot have position information forwarded to an external location-based service provider in order to utilize available location-based services without divulging the identity of the external location-based service provider to their telecom provider.

Furthermore, providing position information to data network-based (e.g., Internet, World Wide Web) service providers adds to the difficulties raised in preserving the privacy of a customer.

For instance, a wireless unit accessing an Internet based service provider must generally be identified by personal information in addition to an IP-address. That is, given only an IP address, the Internet-based service provider generally would not have information sufficient to find the position of that wireless unit in order to provide requested location-based services. Therefore, the user of the wireless unit is generally required to provide personal information such as a wireless unit subscriber number (e.g., phone number) to the data-network service provider. This information can then be used to contact a location information provider associated with the wireless network. As will be appreciated, in this situation, the customer is identified to the service provider, and the service provider is identified to the wireless provider, and the customer's identification and location may be transmitted across lines of transmission in the data network with attendant privacy concerns.

SUMMARY OF THE INVENTION

The present invention addresses various problems involved in locating a wireless communications unit and executing location-based service functionality while protecting the privacy of a user of the wireless unit.

The present inventors have recognized that privacy issues can be addressed, in connection with location-based services obtained via a data network, if wireless units accessing data networks are only identified to a data network site (e.g., web page) by a data network address, such as an IP address, and this address is indexed against a wireless unit's identifier, such as a subscriber number, within the wireless network to execute such services. For example, wireless units utilizing a dial-up server to access a data network, such as the Internet, may be assigned an IP address by the dial-up server. Accordingly, such a dial-up server can provide a record of both the network address and the subscriber identifier. Thus, the identity of a wireless unit accessing data network services may be selectively provided to a location-based service provider within the data network. Alternatively, in order to protect the identity of the wireless unit requesting these data network-based services, the inventors have recognized that the identity of the wireless unit may only be provided to a location-finding system within the wireless network. Then, location information provided to the data network service provider may be indexed against the data network address assigned to the wireless unit. In this regard, a service provider in the data network may receive a service request from a wireless unit identified by a data network address, and may receive location information for that data network address, without the identity of the wireless unit or other personal information ever leaving the wireless network.

Various methods and associated structure (collectively "systems") are disclosed herein for providing location information to a wireless unit of a wireless communications network from a location-based service provider of a data network. These systems include those wherein the identity of a wireless user may be hidden from a service provider within the data network and systems where information regarding the location of the user is encrypted such that no unsecured communication lines exist between the user of the wireless communications network and the data network. In a further implementation, a double-blind system is utilized wherein the identity of a wireless user is hidden from a data network service provider, and the identity of the data network service provider is hidden from the wireless network which is utilized to provide location information to the user. In this instance a wireless user may anonymously (from the perspective of the service provider) access services from a service provider without the wireless network obtaining information as to what services the wireless user accesses.

According to a first aspect of the present invention, a unique identifier is used for implementing location-based services via a data network. The system involves receiving a request for location-based services regarding a wireless communications unit in a wireless communications network, where the location-based services involve data network resources. In conjunction with receiving the request for location-based services, a unique identifier associated with the wireless unit is obtained. This unique identifier is separate from the wireless network subscriber identity assigned to the wireless unit within the wireless communications network (e.g., different than an ESN/MIN). In this regard, this unique identifier may be a user name, an alias, a data network address, or any other information uniquely associated with a given wireless communications unit. This unique identifier is preferably indexed to the wireless network subscriber identity such that the wireless network subscriber identity may be utilized to procure location information for the wireless unit, which is then utilized to provide location-based services in response to the request.

The utilization of the unique identifier associated with the wireless communications unit allows a user of that communications unit or a third party to request location-based services, such as location positioning, for a given wireless communications unit without necessarily divulging the identity of the wireless communications unit to the service provider. In order to preserve this anonymity, the indexing information may be stored at a location separate from the location where the request is received for location-based services. That is, converting the unique identifier to a subscriber identity may be performed within a secured site, e.g., a server within the data network, or a platform within the wireless communications network, which provides firewall or other protection. In this regard, a subscriber number of a wireless communication unit may be indexed to its unique identifier within a storage structure of such a facility. That is, a user of a wireless unit may register with a protected facility to enable such anonymous requesting of location-based services via the data network.

Once the unique identifier of the wireless unit is established, that identifier will be utilized to determine location information associated with the subject wireless unit. One or more location information sources, may be contacted, e.g., via a location gateway platform, to provide location information relating to the position of the subject wireless unit, such as geographic coordinates, a quad tree location, or a location within the wireless network (e.g., cell/cell sector) for the subject wireless unit. Once this location information is procured, location-based services may be provided in response to the request. That is, a location-based service provider may use the location information in order to provide localized information to a requesting party (e.g., the same or a different wireless unit, a wire line unit or other telephony or data network node). As will be appreciated, index information may be stored within a firewall-protected facility in the data network, wireless communications network or at another relocation. In this regard, a service provider need not know the identity of the requesting party, and the provider of location information for a wireless unit need not know the identity of the service provider for which location information is provided.

According to another aspect of the present invention, a network address associated with a service request originating from a wireless unit is used in executing location-based services. In particular, a data network address associated with the request is identified and location information associated with that data network address is obtained. Based on the location information, the requested services are provided for the data network address associated with the request. That is, information localized to the location associated with the data network address is provided. The location information is preferably requested from a platform where location information is indexed to data network address related information. As will be appreciated, this platform may be accessible via the data network, e.g., a server within the data network, or may comprise a platform within the wireless communications network. In either case, the platform will be able to procure location information from a source within the wireless communications network.

When a location platform is utilized, the data network address maybe associated with the request received at the platform. In this regard, the platform may be operative to convert the data network address into an identifier of the wireless communications unit for which services are requested. As will be appreciated, the location platform may access various nodes within the wireless communications network in order to determine such information. For example, the location platform may contact a dial-up server that originally assigned the data network address to the requesting wireless unit, to identify a subscriber number (e.g., MIN/ESN) associated with the wireless unit. In this regard, the location platform may contain a look-up table that correlates IP addresses with dial-up servers. Once the identity of the wireless unit is obtained, the identity may be utilized to procure location information for that wireless unit.

The step of procuring location information for an identified wireless unit may be performed in a variety of ways. For example, the location platform within the wireless communications network may contain a location information cache that includes stored location information. This information may include, without limitation, GPS location information, network structure information (e.g., cell and/or cell sector information), or information provided by triangulation technologies such as AOA and TDOA, etc. Alternatively, if no stored location information is available, the location platform may invoke one or more location-finding equipment systems to produce location information for the wireless unit. These systems may, for example, include any or all of the following, GPS, AOA, TDOA, as well as network structure identifiers (e.g., cell/cell sector).

Once location information is determined for a wireless unit, the information may be provided to the location-based service provider in the data network through any appropriate communications channel. In one implementation, the location information is provided to the location-based service provider within the data network without information as to the identity of the wireless unit. That is, in response to a request to provide location information for a given data network address, the location information is returned for that data network address-without revealing the identity of the wireless unit assigned to that data network address. In this regard, the identity of the wireless user is never transferred across the data network and the privacy of that user is protected.

Alternatively, if protecting the privacy of the user is not critical, the identity of the subscriber may be provided along with the location information. Furthermore, in non-critical situations, a user may themselves provide identity information when requesting location-based services in a data network. That is, the user may enter a subscriber number (e.g., phone number) along with a request for location-based services. In this case, the location-based service provider may provide the subscriber number to the location platform, which may then utilize the subscriber number to determine location information. As will be appreciated, this eliminates the need to convert the data network address into an identifier associated with a wireless unit for such applications. Furthermore, it will be appreciated that any or all of the above communications between the data network and the wireless communications network may be encrypted to provide additional identity security. For example, if a data network service provider receives the subscriber number for a wireless unit requesting location-based services, the service provider may encrypt that subscriber number in a request for location information to a location information source. In this regard, the location information source may require an appropriate code key to decrypt the encrypted subscriber number.

According to another aspect of the present invention, a data network address is used to obtain location information for a wireless unit. The associated system involves receiving a request for location information from a location-based service provider in a data network that includes a data network address associated with a wireless communications unit requesting location-based services. This data network address is translated into a subscriber identity associated with the wireless communications unit in order to procure location information from a location information source within the wireless communications network. As will be appreciated, most sources of location information within a wireless communications network require the subscriber identify, such as a phone number, MIN/ESN, of a wireless unit in order to locate location information for such a unit. In any case, once location information is determined for the identified wireless unit, that information is provided to the location-based service provider within the data network. As will be appreciated, this location information may be provided free of the subscriber identity such that the identity of the wireless unit and hence, the identity of the user of that wireless unit, never leaves the wireless communications network.

The steps of receiving a request for location information, translating a data network address into a subscriber identity and procuring location information for a wireless unit may be performed at various locations within the wireless communications network. For example, a location platform operable to receive such requests may further be operable to contact other nodes within the wireless communications network, such as dial up servers, location-finding equipment systems, as well as location information repositories to provide one or more of the required functions. However, it will be appreciated that one or more of these functions may also be integrated in to a single platform.

According to another aspect of the present invention, location information for a wireless unit is provided from location equipment to a location-based service provider within the wireless network based on monitored communications between the wireless and data networks, e.g., without the service provider having to request such information. In this regard, data communications between a wireless unit and a location-based service provider within a data network are monitored. When a request for location-based services is identified within a data communication therebetween, location information is produced for that wireless unit and provided to the location-based service provider to use in providing location-based services. Again, it will be appreciated that the wireless service provider may not be privy the identity of the wireless unit requesting such services. In this regard, the location information for such unit may be provided free of its subscriber identity to protect the integrity of the requesting user.

Communications between the wireless unit and the data network service provider may be routed through, for example, a dial up server and/or a WAP gateway server. These platforms may provide the wireless unit access to the data network as well as provide translations functions that enable the wireless unit to access material available within the data network. Additionally, these platforms or other entities within the wireless communications network may provide the monitoring functions to identify location-based service requests. In any case, monitoring will generally entail identifying information within a data communication, e.g., parsing header information within a data transmission, in order to identify information known to be associated with a request for location-based services.

In conjunction with identifying this request for location-based services, a source identity, such as a data network address or subscriber number, of the requesting wireless unit may be determined. This source identity is utilized to procure location information for a requesting wireless unit. This may entail the sub-steps of translating a data network address into a subscriber identity associated with the wireless unit for use by a location platform operable to provide location information for an identified unit. Alternatively, if subscriber number is readily available, e.g., included within the data communication or a caller ID is available, a location information source may be directly provided with this information.

Providing the location information to the location-based service provider may entail providing location information in a separate communication or embedding such location information into the service request. That is, upon identifying a location-based service request, the data communications between the wireless unit and the data network service provider may be rerouted in order to both identify location information associated with the wireless unit, and insert such location information into said request. In this regard, upon receiving the request for location-based service, the data network service provider also receives location information.

In another aspect of the present invention, a data network is searched based on a user-specified search criterion and location information for a wireless unit obtained from location equipment. In this regard, a location-based service provider, which performs searching functions, receives a data network search request originating from a wireless unit. The search request includes at least a first search parameter, for example, "find hotel information." Additionally, a data network address of the requesting wireless unit maybe provided to the location-based service provider in order for the location-based service provider to return information thereto. This data network address may be utilized to determine a location associated with the requesting wireless unit. For example, a location platform within the wireless communications network may be contacted to provide location information associated with such data network address. In one implementation, once the location information is provided, the search parameters provided in the data network search request (e.g., hotel information), along with the location associated with the data network address (e.g., location associated with the wireless unit), are used to identify requested information wherein that information is related to a geographic area associated with the wireless unit. That is, in the stated example, information relating to hotels within a geographic location relative to the wireless unit may be provided.

In a further embodiment of the present aspect, the data network address of the requesting wireless unit may include a geo-code that provides an indication of the wireless unit's position. In this regard, a dial-up server may include a code that is related to, for example, the cell or cell sector a wireless unit uses to access the server. Accordingly, this code may be utilized for searching purposes.

In any case, utilizing the location information to perform a search may entail requiring the content of search results, such as web pages from the World Wide Web, to include a reference to an area associated with the location of the unit. Alternatively, the search may be limited to data network sites (e.g., web pages) which include some sort of acceptable geo-code. In one embodiment, web pages would include a geo-code in their URL addresses. By, limiting data network searches to an area associated with a requesting wireless unit, the total number of matching results for a given search parameter may be greatly reduced. As will be appreciated, in the limited bandwidth environment of wireless communications this may provide enhanced data network searching wherein the total amount of information located is limited to localized information.

According to another aspect of the present invention, the identities of a location-based service provider and a wireless communications network operator remain hidden from one another to provide enhanced identity security for a user accessing a location-based service application. In this regard, an intermediate platform (e.g., within the data network or within the wireless network) between the location-based service provider, who may be located within a data network, and wireless communications network operator(s), provides a translation function between these entities to anonymously request location information for a wireless unit and anonymously provide location information to a service provider. The system involves receiving provider information from a location-based service provider that includes the identity of the service provider and an identifier (e.g., an encrypted identifier) associated with the wireless unit. The identifier is correlated with an subscriber identification number that identifies a wireless unit within a wireless communications network. The subscriber identification number may be provided in encrypted form to a location platform operable to decrypt the subscriber number as necessary and provide location information for an identified wireless unit. As will be appreciated, the identity of the service provider is thus withheld from the location platform. Location information is received from the wireless location platform, free of any non-encrypted identity associated with the wireless unit, and that location information is provided to the location-based service provider who may then utilize the location information to provide location-based services. As will be appreciated, as both the identifier and subscriber identification number are preferably encrypted, the intermediate platform which stores and/or correlates the information is not privy to the identification of the wireless unit. In this regard, none of the entities, service provider, intermediate platform, or wireless location platform contains a full identity the wireless unit and the services utilized thereby.

The identifier associated with the wireless unit may be a user name, the actual subscriber number of the unit, or other alias chosen by the user of the subject wireless unit. In any case, the request for location-based services, which may be provided by the wireless unit, or, by a third party through, for example, another wireless unit and/or a data network portal such as a website will include an identifier of a wireless unit for which services are sought. The service provider encrypts the identifier prior to transfer utilizing an encryption key that, preferably, is known only by the service provider.

The location platform is also operable to encrypt and/or decrypt information in order to provide location information for a wireless unit. For example, the location platform receives an encrypted subscriber identification number, such as an ESN/MIN number associated with a wireless unit that, once decrypted, will allow the location platform to procure location information for the identified wireless unit. As in the above aspects of the present invention, this location information may be procured from any location information source including, without limitation, stored information, as well as information procured from location-finding equipment systems. In any case, this location information may be provided back to the intermediate platform free of the identity of the wireless unit to maintain anonymity within the system.

In order to provide double blind location-based services, an encrypted identifier from a location-based service provider may be correlated relative to an encrypted subscriber identification number for a wireless communications unit. In this regard, the encrypted identifier and encrypted subscriber identification number are stored in a storage medium and indexed relative to one another. In connection with storing the encrypted sets of information, the intermediate node registers the encrypted identifier and encrypted subscriber number.

In one embodiment, a user may register with the intermediate node upon requesting secured location-based services. In this regard, a user requests location-based services from a location-based service provider and provides an identifier for the wireless unit (e.g., John Doe 1). The location-based service provider encrypts this information and provides it to the intermediate node to correlate with an encrypted subscriber identification number. However, if there is no encrypted subscriber identification number correlated to the encrypted identifier (e.g., John Doe 1) a link may be provided to the requesting user (e.g., through the service provider) to access a service page associated with a location platform. Accordingly, the user may register with a location platform by providing, for example, the subscriber identification number associated with the wireless unit they are registering. The location platform may then authenticate the wireless unit by, for example, contacting the wireless unit to seek authorization for registration thereof In any case, upon receiving the registration of the subscriber identification number, the location platform may provide an encrypted form of the subscriber identification number to the intermediate node for storage with the encrypted user identifier (e.g., John Doe 1). As will be appreciated, in this method the location-based service provider identity can be withheld from the location platform, the location platform identity can be withheld from the location-based service provider, while the intermediate node has no information other than encrypted information regarding the user. A system is thus created wherein no records are created for a transaction between a wireless communications unit and a location-based service provider.

According to another aspect of the present invention, an encrypted subscriber identification is associated with a service request and is used to securely process the request. In the associated system, data communications originating from a wireless unit within a wireless communications network are monitored to identify requests for location-based services from service providers within a data network. Upon identifying a service request, a subscriber identification for the requesting wireless communications unit is identified. The subscriber identification number is then encrypted and provided to the location-based service provider. This may entail inserting the encrypted subscriber identification number within the request such that the location-based service provider receives both the service request and the encrypted subscriber identification number concurrently. Alternatively, the encrypted subscriber identification number may be provided to the service provider separately. In any case, the location-based service provider provides the encrypted subscriber identification to a location platform operable to utilize encrypted subscriber identification numbers to provide location information. In this regard, a location platform, which may be operated by the carrier for the requesting wireless unit, will receive the encrypted subscriber identification number, decrypt the subscriber identification number to identify a wireless unit, procure, location information for the wireless unit, and provide the location information to the service provider. Again, in order to protect the integrity of the requesting wireless unit, this location information may be provided to the location-based service provider free of the identity of the wireless communications unit.

BRIEF DESCRIPTION OF THE DRAWINGS

The text of the description refers to the attached figures for a better understanding of the present invention and its embodiments or exemplifications, where:

FIG. 5 illustrates another embodiment of a system for ensuring the security of user identity and position information, wherein SMS communications are utilized.

DETAILED DESCRIPTION OF THE INVENTION

The present invention relates to data network-based applications for providing location-based information to wireless units within a wireless communications network. In general, such applications allow a wireless unit user to access a location-based service provider via a data network such as the Internet. The present invention allows for provision of location-based services to a wireless unit where the position information and identity of the wireless unit is protected. In this regard, the identity of the wireless unit, e.g., telephone number or other identity information, remains within the wireless communications network and is not transmitted throughout the data-network or encrypted transmissions are utilized to deter unauthorized dissemination of information. In one implementation, the identity of the wireless unit and hence the identity of its user remain unknown to a data network-based service provider while location information is provided to that service provider to enable the provision of the requested location-based services. In another implementation, a centralized or proxy server is disposed between the data network-based service provider and the location facilities of the wireless communications network to allow a double blind location-based services request to be provided to a wireless unit. In this case, a data network-based service provider does not necessarily know the identity of wireless unit requesting location-based services or the wireless network operator associated with the wireless unit and the wireless communications network operator does not know the identity of the service provider for which it is providing location information. Both of the above-described implementations will be fully discussed herein.

Figure 1:
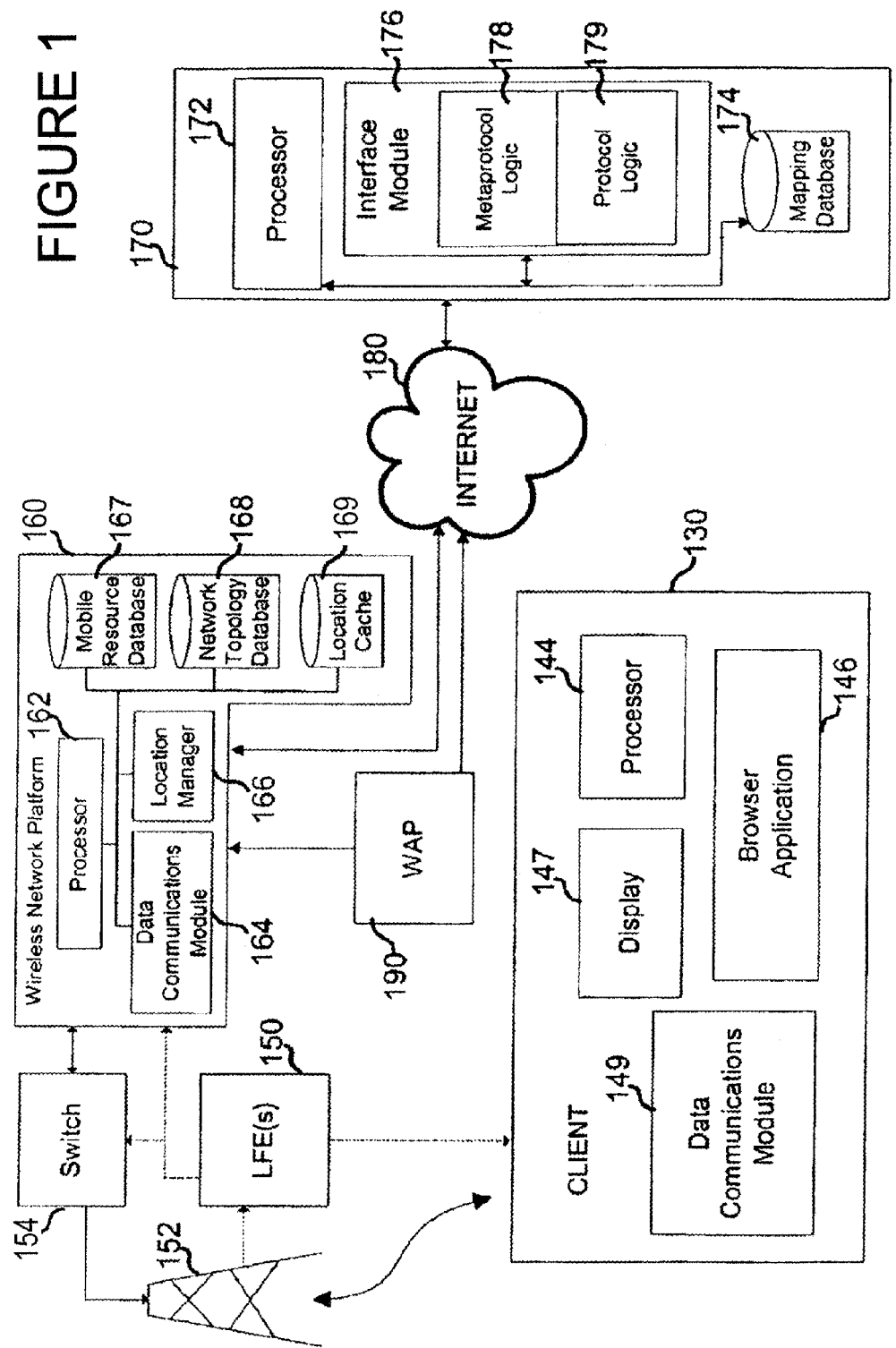
FIG. 1 illustrates one embodiment of a system for ensuring the security of user identity and position information in accordance with the present invention.

FIG. 1 illustrates one embodiment of an integrated wireless communications network and data network 100 that may be utilized for providing location-based services from a data network service provider 170 to a wireless communications unit 130 via the Internet 180. The location-based services are provided to a client platform 140 within the wireless unit 130, or may be provided at a remote location, e.g., a remote user requesting location of a mobile unit 130. The illustrated system 100 also includes a wireless network platform 160. The wireless network platform 160 is selectively connected to the wireless unit 130 via a network switch structure 154, such as a mobile switching center (MSC) or service control point (SCP), cell site equipment 152 and an air interface. Although the cell site equipment 152 is illustrated as a single antenna, it will be appreciated that the wireless network will generally include many cell sites. In addition, each cell site may include multiple antennas, e.g., each covering a sector of the associated cell. The illustrated data network service provider 170 communicates with the wireless network platform 160 via the Internet 180 in the illustrated embodiment.

Depending on the nature of the wireless unit 130, the processing and display capabilities may vary. For example, in the case of a vehicle with an onboard computer and high resolution monitor, a full range of processing and display capabilities may be available. By contrast, where the wireless unit 130 is a PDA or wireless telephone, the processing and display capabilities may be quite limited. In addition, processing of graphical location information may be bandwidth limited. For example, in the case of a laptop computer interconnected to a wireless network via a CDPD phone/modem, the graphics and processing capabilities may be significant, but the available bandwidth may limit the graphical display information that is available at a given time or within a given time period.

The wireless network platform 160, which may, be located proximate to the switch 154, includes a processor 162 for running applications 164 and 166 and accessing databases 167-169. The wireless unit database 167 may include various kinds of information regarding the wireless units of the network. Such information may be indexed against a wireless unit identifier such as an MIN/ESN. For example, the stored information may relate to a subscriber service plan, subscriber rating zones such as a home zone of the subscriber where the subscriber pays reduced calling rates, or subscriber preferences regarding lodging, restaurants or other services.

The network topology database 168 stores information regarding a current topology or configuration of the network. In this regard, it will be appreciated that network topology changes from time to time, for example, as new cell site equipment is added to meet demand or enhance network coverage. As will be appreciated, such network topology including, for example, the coverage areas of specific cell sector antennas may be useful in obtaining location information regarding a wireless unit.

The location cache 169 stores recent location information regarding monitored wireless units. Depending upon the nature of the location-finding equipment involved, such location information may be based on a cell or cell sector location of the wireless unit, or may include more accurate coordinate information such as from GPS, network assisted GPS or network multilateration, e.g., triangulation technologies. Preferably, the location information is stored in a standard format defining, for example, location coordinates and an uncertainty radius. Thus, in the case of a cell sector location, the location may-be stored in the location cache 169 as a center point or other reference coordinates for the cell sector and an uncertainty radius. It will be appreciated that the location information need not be stored as coordinates and a circular uncertainty region, but rather, areas of other shapes including complex and discontinuous areas may be supported.

The location manager 166 is operative for performing a number of functions relative to managing location information for various wireless units and associated location applications. Thus, for example, the location manager may receive raw or processed location information from an LFE 150, express the location information in a standard format and store the information in the location cache 169. In addition, the location manager 166 may receive location requests from specific location-based service applications. Thus, the location-based application 170 provides information which the location manager 166 utilizes to identify a wireless unit 130 of interest, as will be more fully discussed herein. Based on this request, the location manager 166 can access the location cache 169 to determine whether any suitable location information is available for the identified wireless units and, if not, may invoke an LFE 150 to obtain appropriate location information.

The illustrated wireless network platform 160 also includes a data communications module 164. The data communications module 164 is operative for facilitating data communication as between the Internet 180 and a wireless network. In this regard, the data communications module may act as a dial-up server for the wireless unit 130. A number of technologies and protocols are available for this purpose. For example, CDPD systems use available bandwidth of a wireless network to communicate data packets. Thus, in the case of CDPD systems, the data communications module 164 is operative for handling communications between the wireless unit 130 on the one hand, and Internet sites on the other, in accordance with the CDPD protocol. Additionally, other protocols I may be utilized in some instances, where a WAP server 190 is incorporated into the system 100, as will be discussed herein. In any case, the upon connection of the wireless unit 130 to the data communications module 164 for facilitating data communication via the Internet 180, the wireless unit will be assigned an Internet address (e.g., an EP address). Accordingly, the data communications module 164, or an associated processor within the wireless network will record a subscriber number associated with the wireless unit 130 (e.g., telephone number) indexed against the assigned IP address, to allow later conversion of the IP address into the subscriber number for location purposes, as will be discussed herein. It will be appreciated that the nature and functionality of the data communications module 164 may vary depending on the operating environment.

In the illustrated embodiment, the location-finding equipment (LFE) for providing location information regarding wireless units of interest is generally indicated by box 150. It will be appreciated that the nature of the location information provided, including its accuracy and the pathway for transmitting the information, will depend on the location technology employed. In the case of fully integrated GPS systems associated with the wireless unit 130, the location information may be computed at the wireless unit 130 and then transmitted to the wireless network platform 160 via the cell site equipment 152 and switch 154. From the wireless network platform 160, the information may in turn be transmitted to the service provider 170 via the Internet 180. Similarly, for a variety of other location-finding technologies associated with the wireless network, including AOA, TDOA, network assisted GPS, cell, cell sector, and microcell technologies, the location information may be transmitted to the wireless network platform 160 and then to the service provider 170 via the Internet 180. Alternatively, the location information may be transmitted from the LFE 150 to the service provider 170 directly or via the Internet 180.

The illustrated wireless unit 130 comprises a computing unit 142 which includes a processor 144 running a browser application 146, a display 147 and a data communications module 149. The data communications module 149 functions as a mirror image of the data communications module 164 of the wireless network platform 160. Thus, as described above, the data communications module 149 may be operative for handling RF data communications across an air interface in accordance with the CDPD, or other protocol.

The display 147, in conjunction with the browser application 146, is operative to display data pages (e.g., web pages) from data network applications as will be described in more detail below. It will be appreciated that the display 147 may vary from a high resolution monitor to a very limited graphical display, e.g., associated with a wireless telephone, depending on the application. Accordingly, the browser application 146 may be a conventional browser or microbrowser depending on the nature of the wireless unit 130.

The illustrated service provider 170 includes a processor 172 for accessing a service information database 174 and running an interface module 176 including metaprotocol logic 178 and protocol logic 179. The information database 174 stores information regarding the service requested by the wireless unit 130. In this regard, the processor 172 may access particular information based on an instruction from the wireless unit 130 as well as the location of the wireless units 130. In this regard, the processor 170 may generate a web page including the "localized" information that may be downloaded by the wireless unit 130.

In the illustrated embodiment, the service provider 170 also includes an interface module 176. The illustrated interface module 176 allows the service provider to work in a variety of operating environments such as environments involving different location-finding systems, different protocols and different platforms 160 which may employ different messaging sets. In this regard, the interface module includes metaprotocol logic 178 and protocol logic 179. The metaprotocol logic handles communications using generic messaging sets and a generic protocol. That is, within the metaprotocol logic 178 communications do not necessarily conform to any particular industry protocol, but communications are handled according to rules that generally correspond to those of various protocol systems. The protocol logic 179 is operative to translate as between the generic message sets and generic protocol of the metaprotocol logic layer 178 and the various external industry protocols. In this regard, the service provider 170 is enabled to interface with satellite or network based LFEs, and can communicate in accordance with CDPD protocol, PPP protocol, as well as UDP and IP protocols. The service provider 170 thus provides a common platform for supporting services in various operating environments.

The system of FIG. 1 may be utilized in a first implementation to provide location-based services from the service provider 170 to a wireless unit 130 where the service provider 170 never receives the identity (e.g., subscriber number) of the wireless unit 130 requesting said services. In this regard, the wireless unit 130 connects to the Internet 180 through the wireless communications network via a data communications module 164 (e.g., a dial up server). The connection to the data communications module 164 is of the PPP type, and the wireless unit 130 is assigned an IP address. In the connection procedure the data communications module 164 records the wireless unit's subscriber number (e.g., caller ID). In the connection procedure the wireless unit 130 is authenticated. In this authentication procedure, the assigned IP address and caller ID, as well as user identity information (e.g., from mobile resource database 167) are stored, either on the data communications module 164 or in a separate database 167. As shown, the data communications module 164 and mobile resource database 167 are located on a common platform 160, however these are not restrictions.

The wireless unit 130, via the data communications module 164, may further connect to a WAP gateway 190. Alternatively, the functionality of the WAP gateway 190 may be incorporated into the data communications module. In either case, the WAP gateway 190 allows for the content of existing Internet web sites to be prepared for display by simplified browsers associated with wireless units 130. That is, the WAP gateway 190 converts the content of existing Internet/web sites, intended for viewing via standard Internet connections, to a simplified wireless protocol allowing access via a wireless unit 130.

The service provider 170 may be connected to the Internet 180 in any appropriate manner. The user of the wireless unit 130 connects to the service provider 170 by downloading a web page. As will be appreciated, the service provider 170 at this time only identifies the connected wireless unit 130 by its assigned IP address, the service provider 170 does not have access to the subscriber number of the wireless unit. Accordingly, the wireless unit's identity is secured. The subscriber requests location-based services by sending an HTTP inquiry to the server 170 (e.g., clicking a HTTP link on the web page). The server 170 notes the wireless unit's HTTP inquiry and in turn sends an inquiry about the wireless unit's position to a location manager 166 in the wireless network. This inquiry may advantageously take place over an encrypted connection (HTTPS). The following parameters are included in this inquiry, the source IP address which the wireless unit 130 uses on the Internet 180, source port the wireless unit 130 uses, an identity for the service provider 170, and in some instances a password for the service provider 170.

The location manager 166 receives the inquiry from the server 170 and, based on the LP address, identifies a wireless communications network associated with the IP address. This identification takes place by means of stored information about which source IP addresses belong to which wireless networks. The location manager 166 utilizes an IP address translation function to correlate the JP address with a wireless unit subscriber number.

The location manager 166 utilizes the subscriber number to confirm that the wireless unit 130 allows positioning to be executed by the current service provider. This may entail accessing stored records associated with the subscriber number, or, contacting the wireless unit 130 via, for example, an SMS message requesting authorization. Accordingly, the location manager obtains position information for the identified wireless unit 130. As will be appreciated, this may entail accessing stored position information, or, invoking one or more location-finding systems (LFEs) 150 to provide the position of the wireless unit 130. When the position is obtained, the location manager 166 provides the position of the wireless unit and other information, if any, to the service provider's server 170.

Using the returned position and other information, the service provider generates a page including localized information relative to the wireless unit 130, which is returned to the wireless unit 130. In the above inquiry the wireless unit's subscriber's identity never leaves the wireless communications network. The identity and location of the wireless unit and its user is thus not compromised.

As will be appreciated, the ability to procure a location associated with a known data network address allows for provision of numerous location-based services including, for, example, provision of driving directions, the location of local services (i.e., nearest motel), as well as tracking of mobile resources. Additionally, this location may also be utilized to limit the content of information available on a data network to a locality associated with a wireless unit. In this regard, it will be appreciated that a wireless communications unit is generally limited with regard to its capacity to present large amounts of information, depending on effective bandwidth and window/display. Existing data network search engines (Alta Vista, Yahoo etc.) index the content and category of information. However, the problem for wireless users is accessing too much information. For wireless users, information originating from the geographic area in which one is located or in which one is interested may be of more value. Accordingly, when a search engine is used to search for information that is available via the Internet, a wireless user provided search parameter is utilized along with the wireless unit's current position is used as a reference for the search. An area defined as starting from this position is used to limit the search results. By combining search words and the position in this manner, the result of the search can be limited to comprise localized content within a current area of interest.

The search results may be limited to data pages whose content contains a reference to the area associated with the wireless unit, or, these pages may be indexed to one or more geographic points or areas. For example, a URL (Universal Resource Locator) registered for indexing content, may also be registered to indicate one or more geographic home addresses for the information. That is, a geo-code may be included within the URL for searching purposes and thereby link these indexed pages to geographic points or areas.

Figure 2:
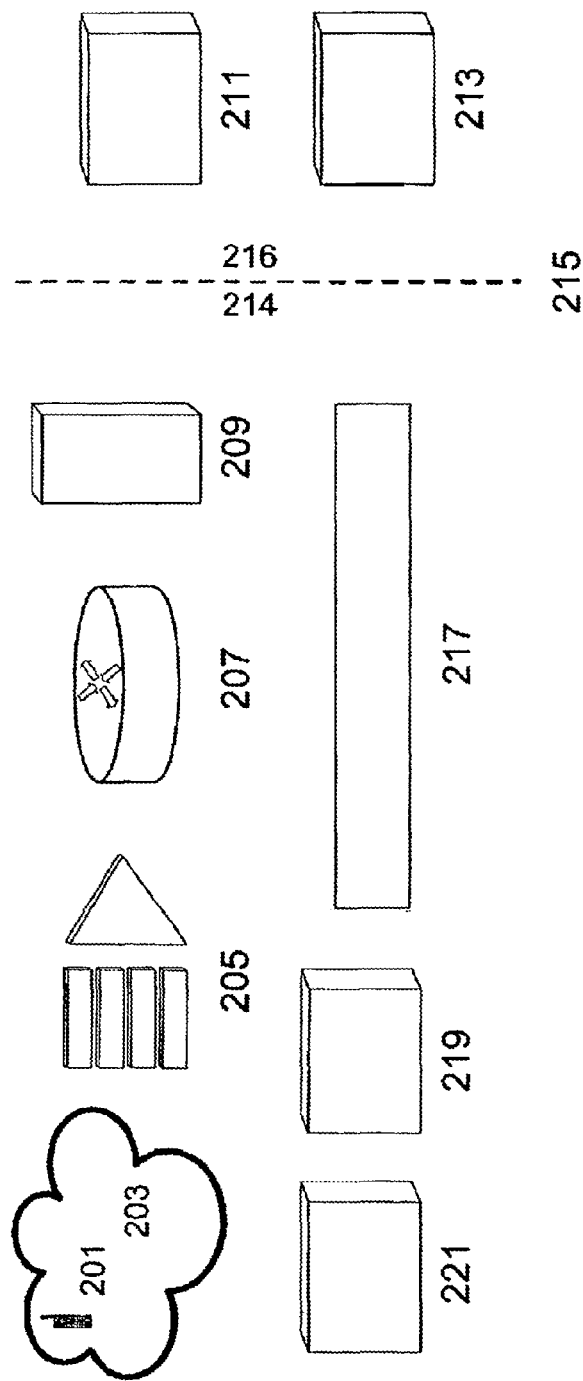
FIG. 2 illustrates another embodiment of a system for ensuring the security of user identity and position information in accordance with the present invention.

FIG. 2 illustrates a second embodiment for providing location-based services from a service provider to a wireless unit where the service provider never learns the identity (e.g., subscriber number) of the wireless unit requesting said services. In contrast to the first embodiment above, this second embodiment inserts location information into location-based service requests prior to these requests being forwarded to a service provider in the data network. As shown, FIG. 2 illustrates a system 200 having an integrated wireless communications network 214 and Internet 216 that may be utilized for providing location-based services from a data network service provider 211 to a wireless communications unit 201 via the Internet 216. As shown, there are no connections between any of the various nodes within either the wireless communications network 214 or the Internet 216 or between the networks 214 and 216. This illustrates that the type of connection between the various nodes and/or the route between the various nodes is immaterial to the operation of the system 200. Furthermore, it will be noted that the various nodes may be incorporated into one or more wireless networks.

Again, the wireless unit subscriber 201 connects via the telecom equipment 203 (e.g., cell towers, repeater stations, etc.) to a computer network within the wireless communications network 214 via a dial-up server 205. The connection to the dial-up server 205 is of the PPP type, and the subscriber 201 is assigned an IF address. The dial-up server 205 records the subscriber's number, the so-called CLID (Caller Line ID). In the connection procedure the user is authenticated. In this authentication procedure, assigned IP address and CLID, among other things, are stored, either on the dial-up server 205 or on a separate server 219. After connection to the dial-up server 205, the subscriber's communications are routed through a WAP gateway 209 in order to access web pages located on the Internet 216. An IP address translation function 207 exists within the wireless network 214, which may be utilized to allow the WAP server to identify the subscriber 201 and communicate directly therewith, but it is not necessary. This address translation function is a logical function that can implemented into the dial-up server 205, the WAP gateway 209 or on a separate network node 207, for example a router. Furthermore, there can be address translation functions between the WAP gateway and the telecom provider's Internet connection.

The subscriber 203 connects to the location-based service provider server 211 by downloading a web page located on the server 211. The subscriber activates a positioning procedure by sending a special http inquiry intended for the server 211. This special http inquiry contains a special domain name, for example "wap.servernamePOSITION.com", which is associated with a special target IP address and which is used exclusively for positioning services. On the WAP gateway 209, the routing list contains an entry for this special target EP address, which points out that packets intended for this positioning service site "wap.servernamePOSITION.com", will be re-routed to the IP address positioning platform 217 to insert position information into the request. As in the above embodiment, the positioning platform 217 acts as a location gateway operable to provide positioning information regarding an identified wireless unit from any of a plurality of location information sources.

When the HTTP inquiry arrives at the positioning platform 217 a positioning process is executed. Initially, the positioning platform extracts the source IP address and source port assigned to the subscriber 201, e.g., identifying data packet information associated with the HTTP inquiry indicating its origin. The positioning platform 217 contacts the address translation function 207 to convert the identified IP address and port into a subscriber identification number (e.g., telephone number) utilized internally on the wireless network. Given the subscriber number, the positioning platform 217 first confirms that the subscriber 201 allows positioning to be executed by the current service provider 111. This may entail accessing a database to determine if the subscriber 201 has a list of allowable providers, allows all, or allows no location-based service providers to provide services. Given a positive confirmation, the positioning platform 217 obtains position information for the identified subscriber. As noted above, this may entail accessing stored position information, or, invoking location finding equipment 221 within the wireless network. Further, depending on the service provider 211 for which the position information is being obtained, position information of varying quality may be obtained. This quality may consist of an allowable age, an allowable geographic uncertainty, cost or other definable parameter associated with the position information.

Given the subscriber's position, the positioning platform 217 inserts the position information into the rerouted HTTP request, free of the subscriber's, identity and forwards it to the service provider 211. Accordingly, the service provider 211 utilizes position information and request information to generate a responsive page, which is returned to the subscriber 201. If any of the above steps is unsuccessful, the positioning service provider's server 211 may generate a relevant error message, which is returned to the subscriber 201; alternatively, another positioning procedure is initiated.

In an alternative to rerouting a HTTP request from the subscriber 201 to the service provider 211, the WAP server may instead extract origin information (e.g., the subscriber IP address) and destination information (e.g., the service provider IP address) and provide this information to the positioning platform 217. The HTTP request may then continue to the service provider 211 which then awaits position information from the positioning platform 217. In this regard, the HTTP request and position information may take separate paths to the service provider 211. Furthermore, it will be appreciated that communication between the various components within the networks may be encrypted to further enhance user identity security. In any case, the subscriber's identity never leaves the telecom provider's network. The identity of the wireless user is thus not compromised.

Figure 3:
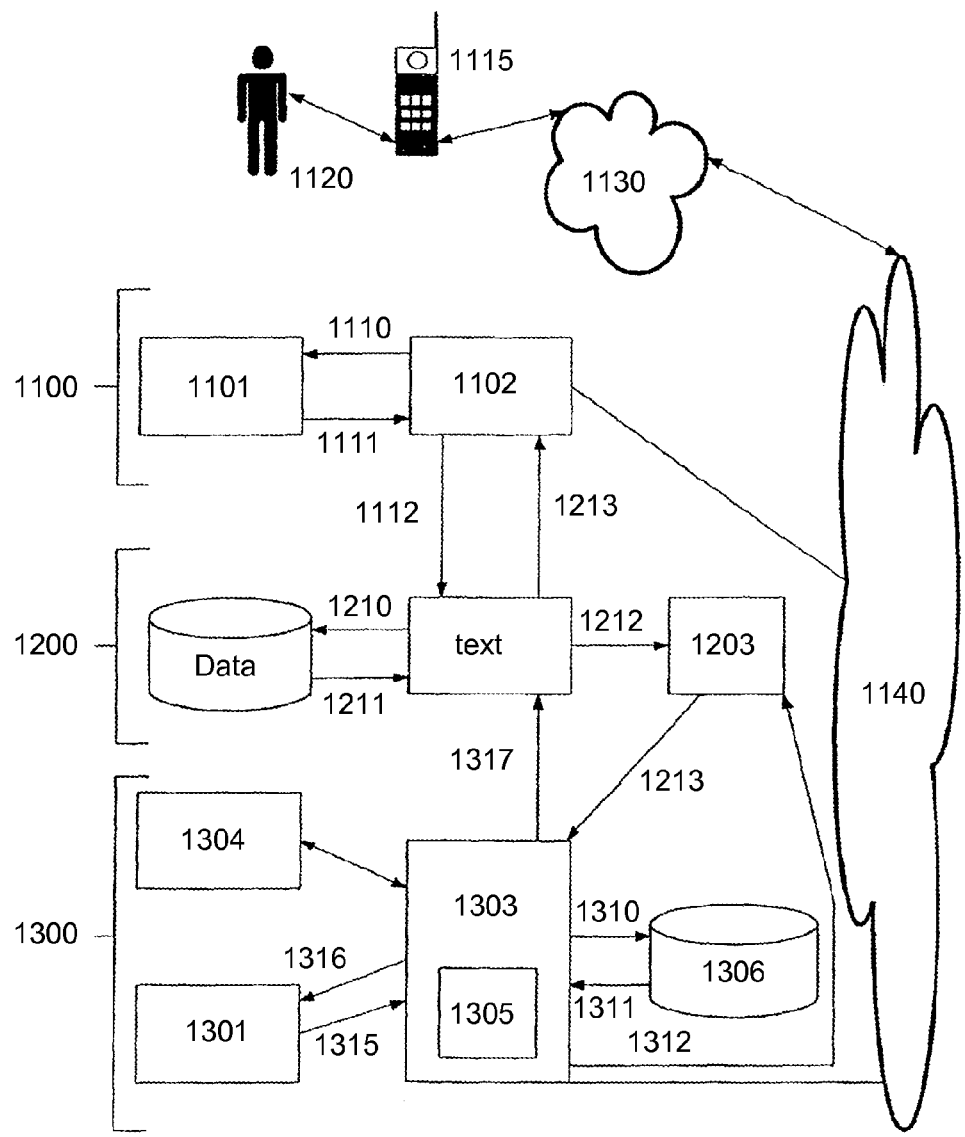
FIG. 3 illustrates one embodiment of an intermediate node system utilized for registering users in a double blind system.
Figure 4:
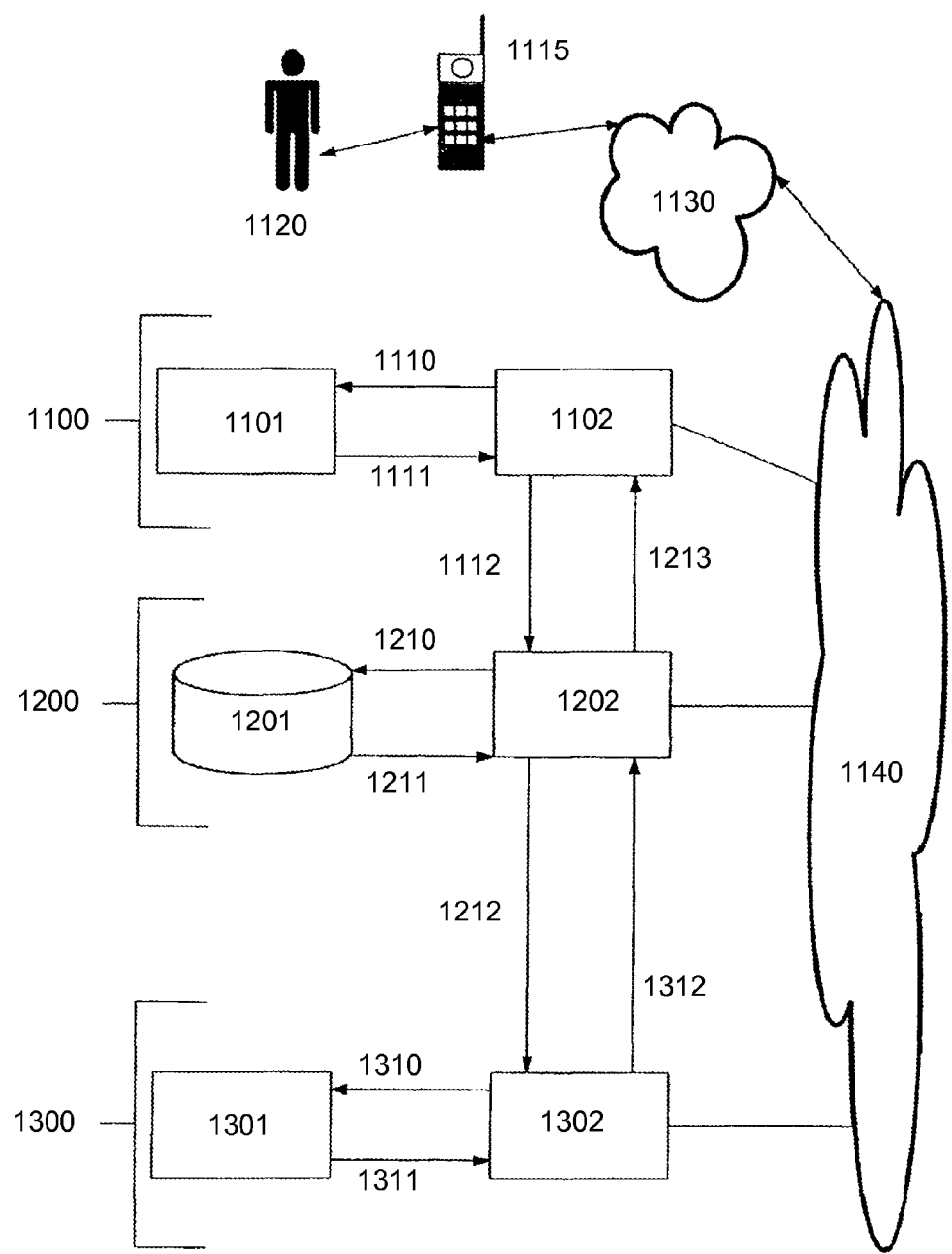
FIG. 4 illustrates the system of FIG. 3 for use after registration.

FIGS. 3 and 4 illustrate a double blind system for positioning wireless units. In this system, a centralized or proxy server 1200 is disposed between the data network-based service provider 1100 and the location facilities 1300 of the wireless communications network to allow a double blind location-based services to be provided to a wireless unit. In this regard, a data network-based service provider does not know the identity of a wireless unit requesting location-based services and the wireless communications network does not know the identity of the service provider for which it is providing location information. To utilize this system, a user must initially register with the proxy server 1200.

FIG. 3 illustrates the procedure utilized when the user of a wireless unit 1115 has not previously used the positioning services of the current positioning service provider 1100. The user 1120 connects through a telephone network 1130 and Internet 1140 to a positioning service provider's network computer 1102. The user 1120 activates a positioning service by sending a request 1 10 along with some form of user identity (e.g., a username, alias, subscriber number, etc.) to the positioning service provider's network computer 1102 which sends the user's identity to an encryption server 1101 via a request 110. The encryption server 1101 encrypts the user's identity with an encryption key and sends back 1111 the resulting service alias to the positioning service provider's network computer 1102. The positioning service provider's network computer 1102 sends a request 112 to a position proxy server 1202, containing at least the service alias and information about the current positioning service.

The proxy server 1202 uses the received service alias to try to obtain a corresponding operator alias from a look-up in a database 1201. If this database look-up is unsuccessful, it means that the user has not initiated positioning services from the current positioning service provider. The proxy server 1202 replies to the request from the positioning service provider's network computer 1102 to the effect that there is not information regarding the service alias.

In order to provide location-based services utilizing the proxy server 1200, the current user of the wireless unit 1115 must register with the proxy server 1200. In this regard, a link, is provided to the wireless unit, via the Internet 1140, which the user can activate to carry out said registration. The positioning service provider's network computer 1102 generates a reply to the user's telephone 1115, containing a link that points to a resource 1203 at the position proxy server. As an alternative, the user 1 120 is automatically directed on to the same resource 1203. The user 1120 activates said link and the position proxy server generates the network page corresponding to the resource 1203 which corresponds to said link and the network page is returned to the user's telephone 1115. This network page 1203 contains a choice of wireless communications operators. The user activates the link corresponding to their wireless communications operator. This link points to a resource situated at the corresponding wireless communications operator's network computer 1303. This resource consists of a page where the user 1120 has to enter his subscriber number (e.g., telephone number). When the user 1120 has provided his subscriber number and returns it to the operator's network computer 1303, the operator first checks whether the telephone number belongs to the operator by a look-up in the database 1306. If the telephone number does not belong to the operator 1300, the user can either enter his telephone number again or the user is also directed back to the network page 1203. If the telephone number belongs to the operator, the operator sends an SMS via the SMS center 1304, containing an identity code to said telephone number. The operator also sends a network page to the user. When the user 1120 has received the SMS message, he enters the identity code on the network page that was returned when he sent the telephone number. The user 1120 sends back the identity code to the operator's network computer 1303, this ensures that the user of the wireless unit 1115, and not a third party, is registering for proxy services. However, once registered, third parties may request location-based services for the wireless unit 1115 if they know its user identity. The operator's network computer receives the identity code and checks its authenticity. If the identity code matches, the user's subscriber number is established. In such case, the operator's network computer sends the subscriber number to an encryption server 1301. The encryption server 1301 encrypts the subscriber number, making use of an encryption key known only to the operator 1300, and produces an operator alias that is provided to the operator's network computer 1303. The operator's network computer 1303 sends a message 1317 to the position proxy server 1202 about the established operator alias. The operator's network computer also directs the user, to a previously determined return address. The position proxy server 1202 saves said operator alias together with the service alias in the database 1201. In this regard, the proxy server 1202, though containing information about both the service provider 1100 and wireless communications operator 1300 utilized by the user of the wireless unit 1115, only contains encrypted information and this cannot determine the identity of the wireless unit 1115. Furthermore, each entity, service provider and operator, utilize separate encryption keys for which they have sole possession. Therefore, the proxy server stores a set of encrypted aliases. While being able to match a given service alias to a given operator alias, the proxy server cannot identify user 1120 information. In the above procedure, the subscriber's identity never leaves the telecom provider's network information regarding the telecom operator is never received by the service provider, and the operator never receives information about the identity of the service provider. Consequently, the security of the user's transactions within the system is not compromised.

FIG. 4 illustrates the use of the proxy server system to provide double blind location-based services in a data network in which a user 1120 has previously registered with the proxy server as described above. Initially, a user of a wireless unit 1115 connects, via the telecom provider's telephone network 1130 and Internet 1140, to a positioning service provider's network computer 102. The user 1120 activates a positioning service by sending a request to the positioning service provider's network computer 1102. For example, the wireless unit 1115 downloads a web page from the network computer and selects a location-based service option. This request will contain some form of identification for the user, such as an anonymous username "John Doe 1," or, if security is not an issue, a user number associated with the wireless unit 1115. As will be appreciated, a third party privy to this identification may also request services (e.g., positioning) for the wireless unit. Furthermore, the location-based services may be requested via another wireless unit or through a terminal in the data network. The positioning service provider's network computer 1102 sends the user's identity to an encryption server 1101 via a request 1110. The encryption server 1101 encrypts the user's identity with an encryption key and sends the resulting service alias back 1111 to the positioning service provider's network computer 1102. The positioning service provider's network computer 1102 sends a request 1112 to a position proxy server 1202, containing at least the service alias and information about the current positioning service.

The proxy server uses the received service alias to identify a previously saved, corresponding operator alias, which also contains encrypted information, from a lookup in a database 1201. Additionally, the proxy server may contact the wireless unit 1115 to request authorization to proceed. The position proxy server 1202 uses the obtained operator alias to request the position from the operator of a wireless communications system location system 1300. The location system's positioning platform 1302 receives said request. The positioning platform 1302 sends the operator alias to an encryption server 1301. The encryption server 1301 decodes the operator alias to obtain the wireless unit's identification number, e.g., MIN/ESN number. The encryption server 1301 sends back the identification number to the positioning platform 1302. The positioning platform 1302 uses the identification number to determine the position from a positioning system 1400. As in the above embodiments, this positioning system 1400 may include stored position information as well as network equipment operable to determine a position of the wireless unit upon request. The so obtained position is sent back to the position proxy server 1202, free of the identity of the wireless unit 1115, which in turn sends the position back to the positioning service provider's network computer 1102. The positioning service provider's network computer 1102 generates a page with position-related content, which is sent to the wireless unit 1115.

FIG. 5 illustrates a system for the secure positioning of wireless units via short message services or SMS. The user 2201 sends an SMS to a particular number, which corresponds to a positioning service at the positioning service provider 2232. The short message service center SMSC 2204 has data which states that all SMS messages to the number corresponding to this positioning service are to be rerouted through an SMS-proxy 2205, located within the operator's firewalls. The SMS-proxy 2205 receives the message from SMSC 2204 and terminates the protocol used outwardly by the SMSC. Between the SMS-proxy 2205 and the position proxy server 2231, a protocol is used which can be a protocol different from that used by the SMSC 2204. The SMS-proxy 2205 extracts the subscriber's telephone number from the received message and converts it along with the current time into an encryption string. This encryption string is inserted into a request and said SMS-proxy sends this message to the position proxy server 2231.

The position proxy server 2231 within the Internet 2230 receives the message, unpacks the protocol used, and requests a position from the an appropriate positioning platform within the wireless communications network 2220 by means of the encryption string. The positioning platform 2207 decodes the encryption string to obtain the telephone number and time. The operator's positioning platform 2207 checks to make sure the received time is current, and in this way gets a validation that said request has recently been made by the subscriber 2201. Given a successful validation, the positioning platform 2207 positions the subscriber and returns this to the position proxy server 2231. The position proxy server 2231 uses the obtained position to request information from the positioning service provider's network computer 2232. Based on the position, the positioning service provider's network computer 2232 generates a reply containing information relevant to the service. The position proxy server 2231 uses the thus obtained information to generate a reply, which is sent to the subscriber via said SMS-proxy 2205 and the SMSC 2204. In the above procedure, the user's identity never leaves the telecom provider's network. Consequently, the personal integrity of the user is not compromised.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method of providing location-based services to a wireless communications unit in a wireless communications network, comprising:
receiving a request for location-based services from the wireless communications unit, wherein the request includes an identifier of a location-based service provider and an identifier of the wireless communications unit within the wireless communications network;
determining location information of the wireless communications unit;
determining a unique identifier associated with the request based, at least in part, on the identifier of the wireless communications unit; and
using the location information and the unique identifier, without the identifier of the wireless communications unit, to provide location-based service information between the location-based service provider and the wireless communications unit via the wireless communications network.

2. The method of claim 1, wherein the unique identifier is unique to the request.

3. A method of providing location-based services to a wireless communications unit in a wireless communications network comprising:
monitoring communications from the wireless communications unit over the wireless communications network to identify a service request to a location-based service provider; and
responsive to identification of the service request:
determining a unique identifier associated with the service request based, at least in part, on an identifier of the wireless communications unit in the wireless communications network; and
providing the unique identifier without the identifier of the wireless communications unit to the location-based service provider for use in providing location-based service information between the location-based service provider and the wireless communications unit.

4. The method of claim 3, wherein the unique identifier is inserted into the service request to the location-based service provider.

5. The method of claim 3, wherein the unique identifier is used to request location information for the wireless communications unit by the location-based service provider.

6. The method of claim 5, wherein the unique identifier and requested location information for the wireless communications unit are used to provide location-based service information between the location-based service provider and the wireless communications unit via the wireless communications network.

* * * * *

UNITED STATES PATENT AND TRADEMARK OFFICE
CERTIFICATE OF CORRECTION

PATENT NO. : 8,548,498 B2  Page 1 of 1
APPLICATION NO. : 13/339295
DATED : October 1, 2013
INVENTOR(S) : Mats Cedervall et al.

It is certified that error appears in the above-identified patent and that said Letters Patent is hereby corrected as shown below:

On the Title Page, item (30):
-- Aug. 30, 2000 (SE)..........0003070 --   should be listed after "Jun. 22, 2000   (SE).......00002390"

Signed and Sealed this
Sixth Day of May, 2014

Michelle K. Lee
*Deputy Director of the United States Patent and Trademark Office*